Aug. 26, 1924.
H. NICHOLS
VEHICLE WHEEL
Original Filed May 17, 1922    2 Sheets-Sheet 1
1,506,602
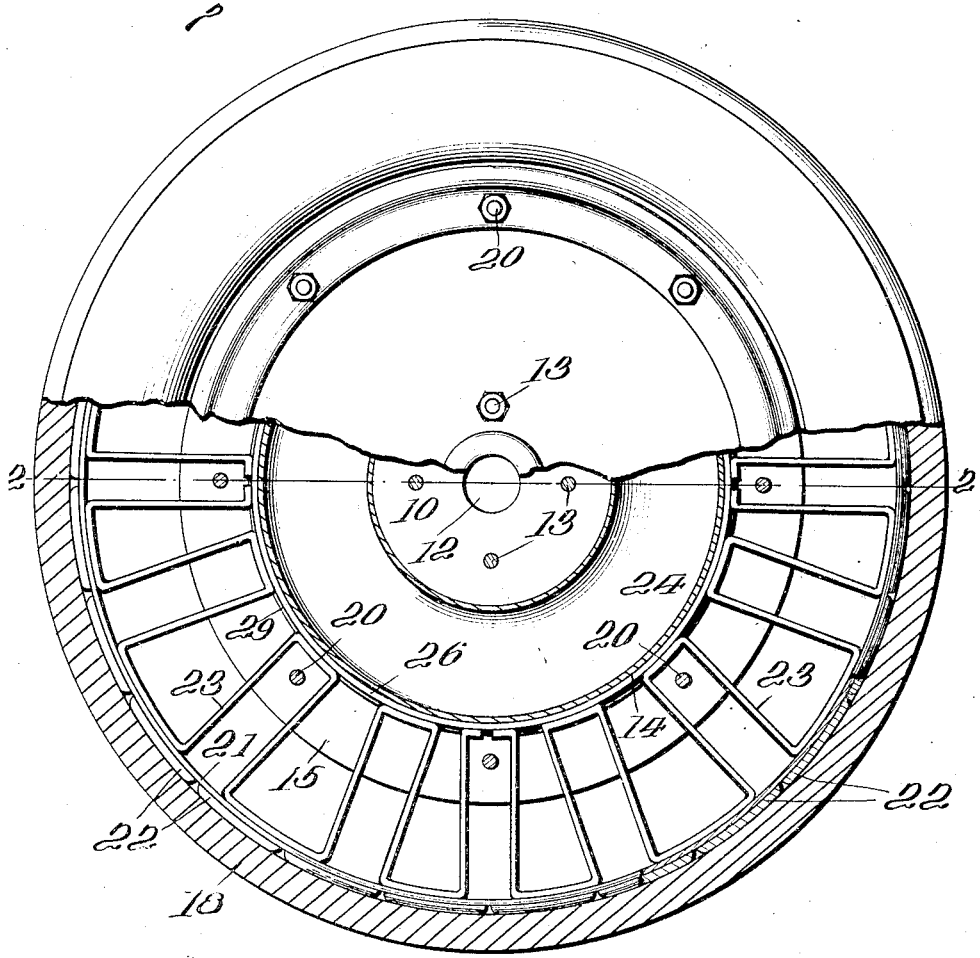
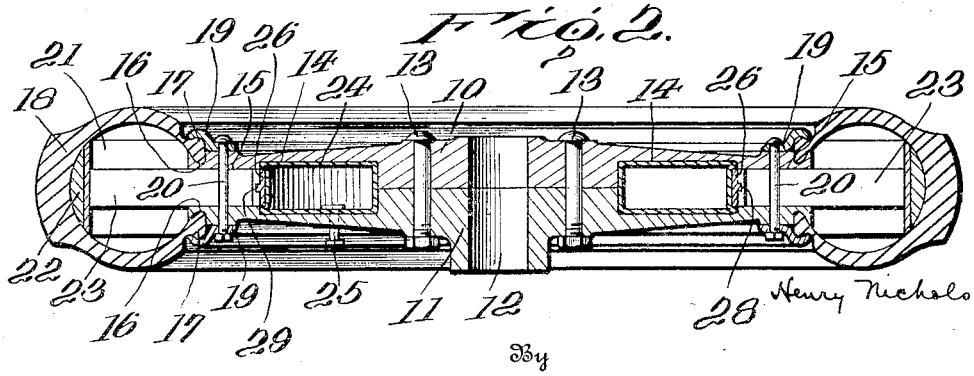
Henry Nichols
By Wm R. Hodges Attorney Aug. 26, 1924.
H. NICHOLS
VEHICLE WHEEL
1,506,602
Original Filed May 17, 1922   2 Sheets-Sheet 2
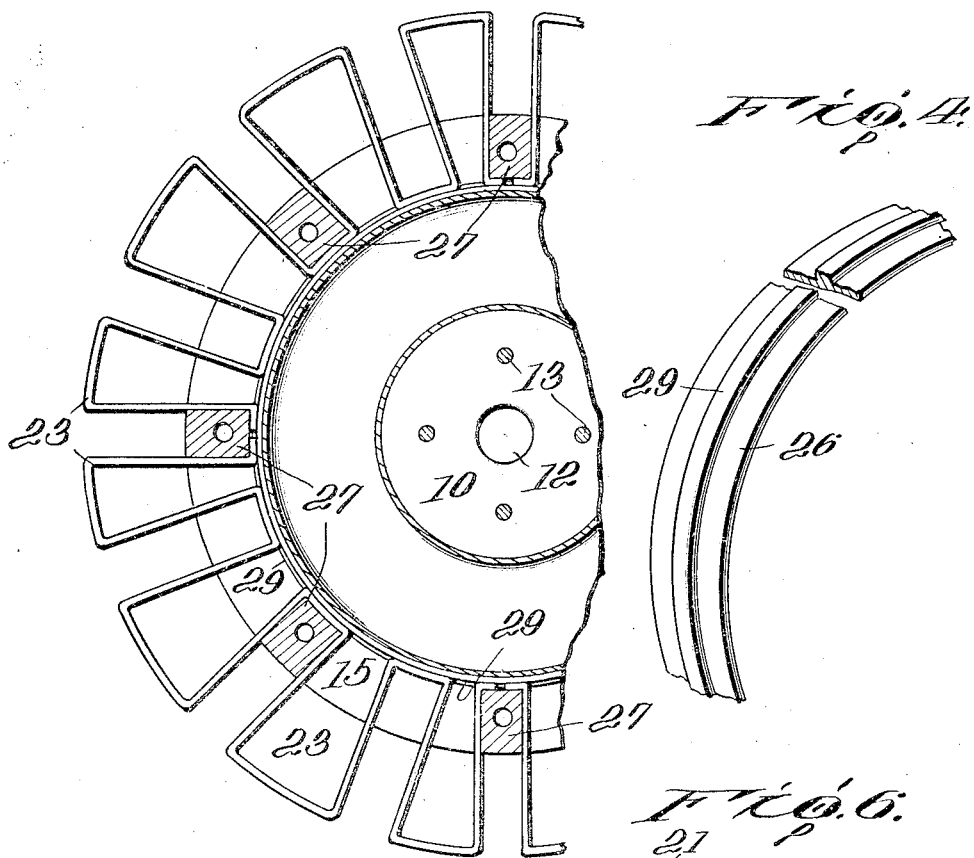
Inventor
Henry Nichols
By Wm B. Hodges
Attorney Patented Aug. 26, 1924.

1,506,602

UNITED STATES PATENT OFFICE.

HENRY NICHOLS, OF NEW YORK, N. Y.

VEHICLE WHEEL.

Application filed May 17, 1922, Serial No. 561,656. Renewed April 8, 1924.

*To all whom it may concern:*

Be it known that I, HENRY NICHOLS, a citizen of the United States, residing at New York, in the county of New York and State of New York, have invented a new and useful Vehicle Wheel, of which the following is a specification.

This invention is a vehicle wheel of the type having means, substituted for the standard pneumatic tire, to absorb road and other shocks incident to travel.

One of the objects of the invention is to provide a wheel of simple construction, which will have all of the beneficial advantages of a wheel with the standard pneumatic tire, and yet not be subjected to the inconveniences which usually result from punctures and blow-outs. A further object is to provide a wheel, having means whereby the shoe of a standard pneumatic tire may be secured thereto, and means within the shoe for transmitting the road shocks around the same, the construction being such that the shoe will not collapse if punctured, whereby it may be worn almost completely through without danger of failure to sustain the load. A further object is to provide a pneumatic cushion for the tire, so positioned that it will not be exposed to wear or contact with the road bed, and means interposed between the same and the tire shoe, to carry the road shocks around the wheel, whereby the weight of the load is stabilized, and a perfect balancing of the cushioning functions is insured. A further object is to provide means to increase the resiliency at the tire shoe. A further object is to provide means by which the shocks may be transmitted to the pneumatic cushion, without the necessity of employing slidable plungers.

The invention will be hereinafter fully set forth and particularly pointed out in the claims.

In the accompanying drawing:—

Figure 1 is a side elevation partly in section illustrating a wheel constructed in accordance with the invention. Figure 2 is a transverse sectional view on the line 2—2, Figure 1. Figure 3 is a sectional view illustrating the method of placing the convolute equalizing member in place. Figure 4 is a detail fragmentary view illustrating a portion of the equalizing spring which contacts with the pneumatic cushion. Figure 5 is a detail view illustrating a portion of the convolute spring. Figure 6 is a plan view illustrating the tread equalizing spring.

Referring to the drawing, the wheel body is shown as constructed of two disk-like members 10 and 11, respectively provided with registering central openings 12, forming the hub of the wheel. Said members are united by bolts 13 as shown, and are provided with complemental annular cavities, which when the members are united, produce an internal concentric chamber 14, located near the periphery of the sections, said chamber being provided with openings 15 leading to the periphery.

The peripheral edges of the members 10 and 11 are provided with external grooves 16 to receive the beads 17 of the shoe 18, of the type usually employed to enclose a standard pneumatic tire. Said shoe is held in place by means of clamping rings 19, having complemental grooves to engage said beads, said rings being removably secured to the body members 10 and 11, by means of bolts 20.

Located within the shoe 18 is a tread equalizing spring 21, provided with segmental pad-like members 22, shaped to conform to the internal contour of the shoe. Bearing against the spring 21, is a convolute equalizing member 23, the convolutions of which extend from the spring 21, through the slots or openings 15. Located within the chamber 14 is a pneumatic rubber tube 24, which may be inflated in suitable manner through a valve 25. Interposed between the convolute member 23 and the cushion 24, and encircling the latter, is an equalizing spring 26.

The convolute bearing member 23 may be constructed of one continuous piece, but it is preferred to construct it in four sections, as illustrated in the drawing, the convolutions being formed with radially disposed, straight portions, and inner and outer bearing surfaces concentric with the wheel. The sections are held in place by means of the spacer blocks 27, interposed between the sections 10 and 11, and engaged by the bolts 20 which retain the rings 19 in place. The outer curved portions of the convolute member bear against the equalizing spring 21, and the inner curved portions of said convolute member bear against the equalizing spring 26. For the purpose of aiding in the prevention of relative lateral play between the spring 26 and the convolute member 23, the latter is provided with grooved portions 28, which interlock with a rib 29, formed on the spring 26.

In practice, the tube 24 is inflated to the desired pressure, approximating the pressure of the standard pneumatic tire, through the valve 25, by means of any suitable tire inflating apparatus. When the wheel is without load the pressure of the air within tube 24, acting against the ring 26, will force the convolute equalizing member 23, outwardly, in a radial direction, and thereby maintain the tire shoe in a distended condition by reason of the pressure of said convolute equalizing member against the spring 21. When the wheel is under load, the spring 21 tends to force the convolute equalizer 23 inwardly, and this pressure is equalized at the shoe 18, by means of the spring 21, being equalized in much the same manner as the standard pneumatic tire distributes the load. The inward pressure of the convolute equalizing member upon the spring 26, causes the latter to press against the pneumatic cushion and to distribute the load around the same in a manner well-understood in the art. At the same time the convolutions of the member 23 tend also to carry the strains around the wheel. Thus the pressure upon the spring 21 is carried through the member 23 and the spring 26, to the cushion 24, and said springs 21 and 26, and the convolute member 23, also react against each other to carry the strains and shocks around the wheel.

From the foregoing it will be readily understood that a very simple and inexpensive wheel is provided, so constructed that the parts may be readily separated if necessary for repairs and the like. A further advantage is that by placing the pneumatic tube 24 between the members 10 and 11, so that it cannot be exposed to direct contact with extraneous substances, all of the beneficial advantages of the standard pneumatic tire are obtained, and yet the inconveniences which normally result from punctures and blow-outs are avoided. Not only is this true, but the shoe may be worn almost completely through without danger of collapse, because it is sustained by the convolute equalizer member 23 and the springs 21 and 26, and, therefore, any air leaks in the shoe can have no effect upon the cushioning characteristics of the wheel. It will be noted that the spring 26 is somewhat narrower than the cavity in which the air cushion 24 is located, thereby allowing the said cushion 24 to engage the same with some freedom of movement, thus reducing tendency to wear out at any particular point. By means of the blocks 27, the convolute members are held in place, and the said blocks at the same time, prevent undue pressure upon said convolute member, when the sections 10 and 11 are clamped together, thereby insuring enough space between the wheel sections to permit the said convolute member to have radial reciprocation under the road shocks. A further advantage of the invention lies in the fact that all shocks are quickly equalized around the entire wheel structure and danger of breaking down is reduced to a minimum.

Having thus explained the nature of the invention and described an operative manner of constructing and using the same, although without attempting to set forth all of the forms in which it may be made, or all of the forms of its use, what is claimed is:—

1. A wheel of the character described comprising a body, a pneumatic cushion enclosed within said body, a tire shoe secured to the periphery of said body, and an equalizing member constructed with convolutions having radially disposed portions interposed between said cushion and said shoe and reacting against both.

2. A wheel of the character described comprising a body, a pneumatic cushion enclosed within said body, a tire shoe secured to the periphery of said body, and a convolute equalizing member interposed between said cushion and said shoe and reacting against both, said convolute member having radially extended portions and also having bearing portions concentric with the axis of the wheel.

3. A wheel of the character described comprising a body, a pneumatic cushion enclosed within said body, a tire shoe secured to the periphery of said body, a band-like equalizing spring encircling said cushion, and a convolute equalizing member interposed between said shoe and said spring and reacting against both.

4. A wheel of the character described comprising a body, a pneumatic cushion enclosed within said body, a tire shoe secured to the periphery of said body, a band-like equalizing spring encircling said cushion, and a convolute equalizing member interposed between said shoe and said spring and reacting against both, said equalizing spring and said convolute equalizing member having interlocking engagement.

5. A wheel of the character described comprising a body, a pneumatic cushion enclosed within said body, a tire shoe secured to the periphery of said body, a band-like equalizing spring encircling said cushion, and a convolute equalizing member interposed between said shoe and said spring and reacting against both, said equalizing spring having a rib and said convolute equalizing member having grooves complemental to said rib.

6. A wheel of the character described comprising a body, a pneumatic cushion enclosed within said body, a tire shoe secured to the periphery of said body, an equalizing spring within said tire shoe, and a convolute equalizing member interposed between said cushion and said spring and reacting against both.

7. A wheel of the character described comprising a body, a pneumatic cushion enclosed within said body, a tire shoe secured to the periphery of said body, an equalizing spring within said tire shoe, and a convolute equalizing member interposed between said cushion and said spring and reacting against both, said equalizing spring having segmental pads bearing against the inner surface of the tread portion of said shoe.

8. A wheel of the character described comprising a body, a pneumatic cushion enclosed within said body, a tire shoe secured to the periphery of said body, a band-like equalizing spring encircling said cushion, a similar equalizing spring bearing against the inner wall of the tread of said shoe, and a convolute equalizing member interposed between and engaging both of said equalizing springs.

9. A wheel of the character described comprising a body, a pneumatic cushion enclosed within said body, a tire shoe secured to the periphery of said body, a band-like equalizing spring encircling said cushion, a similar equalizing spring located within the tread portion of said shoe, and a convolute equalizing member interposed between and engaging both of said equalizing springs, the equalizing spring within the tire shoe having segmental pads bearing against the inner surface of the tread of said shoe.

10. A wheel of the character described comprising a body, a pneumatic cushion enclosed within said body, a tire shoe secured to the periphery of said body, an equalizing member constructed with convolutions having radially disposed portions interposed between said cushion and said shoe and reacting against both, said convolute equalizing member being formed of separable sections, and means retaining said sections in place.

11. A wheel of the character described comprising two separable sections forming a body, a pneumatic cushion enclosed within said body between said sections, a tire shoe secured to the periphery of the body, an equalizing member constructed with convolutions having radially disposed portions mounted between the sections and interposed between said cushion and said shoe and reacting against both.

12. A wheel of the character described comprising two separable sections forming a body, a pneumatic cushion enclosed within said body between said sections, a tire shoe secured to the periphery of the body, an equalizing member constructed with convolutions having radially disposed positions mounted between the sections and interposed between said cushion and said shoe and reacting against both, said convolute equalizing member being arranged in sections, and means retaining said convolute member in place.

13. A wheel of the character described comprising a body formed of two separable sections, a pneumatic cushion enclosed within said body between the sections, spacer blocks maintaining the sections in spaced relation at their peripheries, a tire shoe secured to the periphery of said body, a convolute equalizing member located between said wheel sections and anchored by said spacer blocks, said equalizing member being interposed between said cushion and said shoe and reacting with both.

14. A wheel of the character described comprising two separable sections forming a wheel body, said sections having oppositely disposed recesses, spacer blocks interposed between the sections to form an internal chamber with peripheral openings, a pneumatic cushion within said chamber a tire shoe secured to the periphery of said body, and a convolute equalizing member having portions radially movable in said peripheral openings and engaging said spacer blocks, said equalizing member being interposed between said cushion and said shoe and reacting against both of them.

In testimony whereof I have hereunto set my hand.

HENRY NICHOLS.